INVENTOR.
JOHANNIS C. LODDER
BY
Frank R. Trifari
AGENT

3,351,848
DIRECT VOLTAGE REGULATORS WITH REDUCED DYNAMIC OUTPUT IMPEDANCE

Johannis Cornelis Lodder, Hilversum, Netherlands, assignor to North American Philips Company Inc., New York, N.Y., a corporation of Delaware
Filed June 25, 1965, Ser. No. 467,024
Claims priority, application Netherlands, June 27, 1964, 64—7,351
7 Claims. (Cl. 323—22)

This invention pertains to direct voltage regulators. It concerns particularly such regulators which are adapted to regulate the voltage of direct voltage sources which have an output smoothing filter including a series impedance; such a direct voltage source may comprise, for example, a rectifier and an LC-output smoothing filter connected thereto, the series impedance generally being an inductor.

When using a direct voltage source of the above kind, an abrupt variation in the load connected to the source causes the output voltage to vary appreciably, even if only temporarily. This action of the output voltage is generally unavoidable, due in particular to the presence of the LC-smoothing filter, even when a very efficient voltage stabilizer is used. The dynamic output impedance of the source comprises substantially the series impedance of its output smoothing filter; even when a good voltage stabilizer is used, this series impedance is incapable of instantly changing the amount of current supplied, in either direction, when there is a sudden abrupt change in the load.

Among the objects of the invention are the following:

To reduce the dynamic output impedance of a direct voltage source;

To devise a regulator for a direct voltage source which will provide good voltage regulation even when there is a sudden, abrupt variation in the load coupled to the source; and To provide a regulator for a direct voltage source having an LC-output smoothing filter, which regulator will act to reduce considerably the dynamic output impedance of the source, thus providing good voltage regulation even in the event of an abrupt variation in the load.

Briefly, in accordance with the invention, at least two transitsors are utilized. If the regulator is adapted for use with a direct voltage source having a smoothing filter, the main current circuit of the first transistor is connected between the output terminals of the filter; the main current circuit of the second transistor is connected between the output terminal of the filter series impedance and a point having a potential higher than and of the same polarity as that of said output terminal. The bases and emitters of both transistors are relatively biased such that the transistors are normally cut off. An alternating current coupling is provided between the series impedance and said bases. The arrangement is such that one of the transistors becomes temporarily conducting upon a decrease in the current in the series impedance and the other transistor becomes temporarily conducting upon an increase in the current in the series impedance.

The biasing of the transistors may be accomplished by direct current conductively connecting the base of each transistor to its emitter. This connection is preferably made through a secondary winding of a control transformer, with the primary winding of the transformer being connected between the series impedance and the corresponding output terminals. In this case, the control transformer provides the alternating current coupling between the series impedance and the bases.

The above and further objects and features of the invention will become apparent from the following detailed description of the invention, together with the accompanying drawing, wherein.

Figure 1:
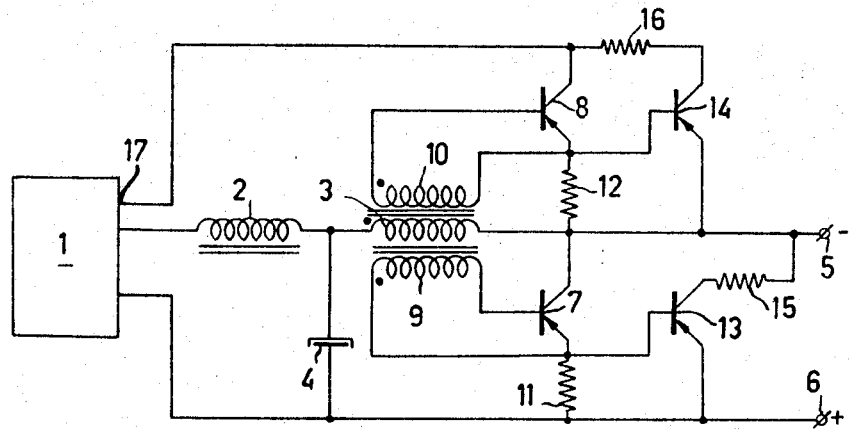
FIG. 1 is a schematic circuit diagram of one embodiment of a voltage regulator according to the invention.

Referring now to FIG. 1, a rectifier 1 constituting a direct current source is therein shown in block form. The rectifier 1 may be fed from the alternating current lines or may be part of a D.C. converter comprising a battery, a voltage inverter and a rectifier; the particular apparatus feeding the rectifier forms no part of the invention. The output of the rectifier is connected as shown to an output smoothing filter comprising the series inductor 2 and the shunt capacitor 4. The negative output terminal of the rectifier is coupled to the negative output terminal 5 of the regulator through the series inductor 2 and a primary winding 3 of a control transformer; the positive output terminal of the rectifier is directly connected to the positive output terminal 6 of the regulator. The main current circuit of a first pnp transistor 7 is connected between the output terminals 5 and 6, its collector being connected directly to terminal 5 and its emitter being connected through a resistor 11 to terminal 6. The main current circuit of a second pnp transistor 8 is connected between output terminal 5 and a point 17 on the rectifier 1; point 17 has a potential higher than and of the same polarity as that of the output terminal 5. The collector of transistor 8 is connected directly to the point 17 of higher negative potential and its emitter is connected through a resistor 12 to the terminal 5. The bases of transistors 7 and 8 are direct-current conductively connected to the respective emitters as shown. These connections are made through secondary windings 9 and 10 of a control transformer and serve to render the transistors normally cut-off.

Upon any variation in the load impedance connected to the output terminals 5 and 6 there will be a variation in the load current and a potential difference is developed across the primary winding 3, with a corresponding voltage being induced in each of the secondary windings 9 and 10. The coupling directions of the windings are chosen such that, upon an increase in the load current, the first transistor 7 is driven further in the cut-off direction while the second transistor 8 becomes conducting and tends to compensate for the increase in load current. Upon a decrease in the load current, the first transistor 7 becomes conducting, tending to compensate for the decrease in load current, whereas the second transistor 8 is driven further in the cut-off direction. Thus, in each case the transistors act to compensate for the voltage drop across the series inductor 2 due to the change in load current. This is due to the fact that the transistors operate as amplifiers with strong negative feedback and counteract any variation in the current flowing through the series inductor 2 by themselves temporarily supplying or absorbing the sudden difference in load current.

In order to amplify the compensation effects, additional power transistors 13 and 14 may be connected as shown. The base-emitter circuits of transistors 13 and 14 are connected through the emitter-load resistors 11 and 12 of the transistors 7 and 8, respectively; the collector of transistor 13 is connected through a current-limiting resistor 15 to the negative output terminal 5 and the collector of transistor 14 is connected through a current-limiting resistor 16 to point 17.

In order to show the effectiveness of the circuit arrangement of FIG. 1, illustrative operating results will be given for a direct voltage source which was constructed in which first the regulator of FIG. 1 was not present and then one in which the regulator as shown, including transistors 7, 8, 13 and 14, was used. The source 1 comprised a controlled rectifier having an output voltage of 16 volts and a maximum load current of 6 amp., the static stability of this source being better than 1%.

The operation when the transistors 7, 8, 13 and 14 were not present was as follows: upon the application of a sudden load with a current $I_5$ of 6 amp. (FIG. 2a), the output voltage abruptly and momentarily decreased by an amount $\Delta V_5$ (FIG. 2b) of approximately 2.5 volts or about 15%. A short voltage peak $\Delta V_5$ (FIG. 2b) of about 1.5 volts or about 10% occurred when the load current $I_5$ was switched off. These changes in output voltage occurred despite the stabilization of the source 1 and are attributable to the dynamic impedance of the direct voltage source, particularly that due to the series inductor 2.

Figure 2:
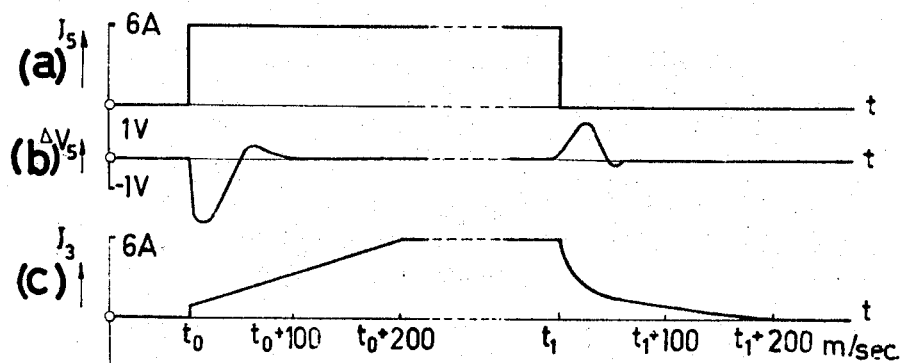
FIG. 2 shows current-time and voltage-time diagrams serving to explain the operation of the embodiment of FIG. 1.

The operation when transistors, 7, 8, 13 and 14 were present and connected as in FIG. 1 was as follows: for the same variation in load, i.e., the application of a sudden load $I_5$ as shown in FIG. 2a, the amplitude of $\Delta V_5$ was approximately 100 mv. peak-to-peak; when the load current $I_5$ was switched off, the amplitude of $\Delta V_5$ was about 50 mv. peak-to-peak. These amplitudes are too small to be seen with the scale used in FIG. 2b.

Again utilizing the example given above, when a load current $I_5$ of 6 amps. is suddenly switched on and off, the current $I_3$ (FIG. 2c) which flows through the series inductor 2 and the primary winding 3, increases slowly and linearly and decreases slowly and almost exponentially within a period of approximately 0.2 second. If the rectifier 1 includes a voltage stabilizing device, the variation in the current $I_3$ is so slow, that this device can always maintain the output voltage at its initial value. A sudden variation in current and hence a voltage jump does not occur anymore at the output of the rectifier 1.

It is noted that a reduction in the dynamic output impedance of the direct current source could alternatively be obtained in the usual manner by means of a capacitor connected to the output terminals 5 and 6. However, a capacitor of more than 1 farad would be required to reduce the voltage fluctuations at the output terminals to a comparable degree.

Figure 3:
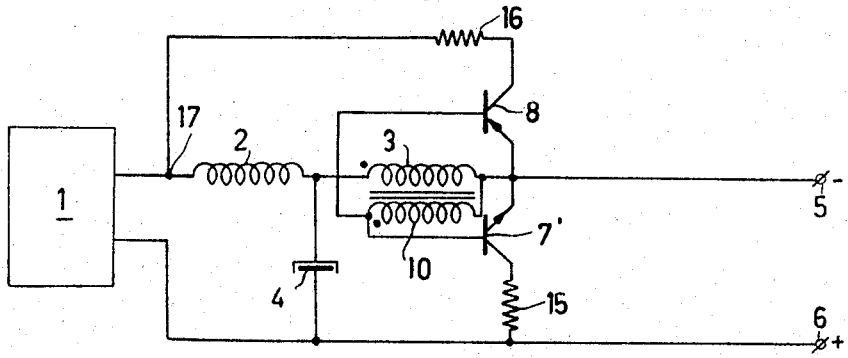
FIG. 3 is a schematic circuit diagram of a second embodiment of the invention.

FIG. 3 is a schematic circuit diagram of a second embodiment of the invention. In FIG. 3 the additional transistors 13 and 14 are omitted. The first transistor 7' is a power transistor of the npn-type. Its emitter is directly connected to the negative output terminal 5 and the collector is connected to the positive terminal 6 through a current limiting resistor 15. The second transistor 8 is a power transistor of the pnp-type whose emitter is connected directly to the output terminal 5 and whose collector is connected through a current-limiting resistor 16 to point 17. Since the operation of a transistor does not require a high reverse collector voltage, the point 17 is in this case the point where the series-inductor 2 is connected to the rectifier 1. The bases of the transistor 7' and 8 are connected to the same end of a common secondary winding 10 whose other end is connected to the emitters of the two transistors and to the negative output terminal 5.

The embodiment of FIG. 3 operates similarly to that of FIG. 1, except only that the compensating current flowing through the collector circuit of each of the transistors 7' and 8 is $\alpha'$ times larger than the forward current induced by the secondary winding 10, whereas in the first embodiment the total compensating current is $\alpha' + (\alpha'+1)\beta$ times larger than the current flowing through the corresponding secondary winding, where $\alpha'$ is the collector-base current gain factor of the transistor 7' and 8 or 7 and 8 and $\beta$ is that of the transistors 13 and 14, of FIG. 1. This means that, with a corresponding decrease in dynamic output impedance the transformation ratio of the control transformer 3, 10 of the second embodiment must be approximately $\alpha'+1$ times greater than that between the primary 3 and each of the secondary windings 9 and 10 of the control transformer of the first embodiment.

It will be appreciated that many modifications and variations will be apparent to those skilled in the art. Thus, a capacitive coupling could be used between the series impedances and the bases of the transistors, for example, with two complementary transistors such as the transistors 7' and 8 of FIG. 3 or in combination with a phase-inverting transistor for control of one transistor of a pair of transistors of the same conductivity types, such as the transistors 7 and 8 or 13 and 14 of FIG. 1. However, it is usually more advantageous to use a control transformer and to avoid RC-networks with their characteristic properties which differ from those of the series inductor.

What I claim is:

1. A regulator for a direct voltage source having an output smoothing filter including a series impedance, comprising: first and second transistors having emitter, base and collector electrodes, the emitter-collector circuit of the first transistor being connected between the output terminals of said filter, the emitter-collector circuit of the second transistor being connected between the output terminal connected to the series impedance and a point at a potential higher than that and having the same polarity as that of said output terminal, means for biasing both transistors to be nonconducting, and an alternating current coupling between said series impedance and each of said bases, said first transistor becoming temporarily conducting upon a decrease in the current flowing through the series-impedance, and the second transistor becoming temporarily conducting upon an increase in said current, whereby the dynamic output impedance of the direct voltage source is reduced.

2. A regulator for a direct voltage source having an output smoothing filter including a series impedance, comprising: first and second transistors having emitter, base and collector electrodes, the emitter-collector circuit of the first transistor being connected between the output terminals of said filter, the emitter-collector circuit of the second transistor being connected between the output terminal connected to the series impedance and a point at a potential higher than that and having the same polarity as that of said output terminal, a direct conductive connection between the base of each transistor and its emitter, said direct current conductive connection biasing the transistors to be normally nonconducting, and an alternating current coupling between said series impedance and each of said bases, said first transistor becoming temporarily conducting upon a decrease in the current flowing through the series-impedance, and the second transistor becoming temporarily conducting upon an increase in said current, whereby the dynamic output impedance of the direct voltage source is reduced.

3. A regulator as claimed in claim 2, further including an emitter resistor in the emitter circuit of each transistor, and third and fourth transistors, the base-emitter circuits of said third and fourth transistors being connected across the emitter resistors of said first and second transistors respectively, and means intercoupling the collectors of said first and third transistors, and said second and fourth transistors, respectively.

4. A regulator for a direct voltage source having an output smoothing filter including a series impedance, comprising: first and second transistors having emitter, base and collector electrodes, the emitter-collector circuit of the first transistors being connected between the output terminals of said filter, the emitter-collector circuit of the first transistor being connected between the output terminal connected to the series impedance and a point at a potential higher than that and having the same polarity as that of said output terminal, a direct conductive connection between the base of each transistor and its emitter, said direct current conductive connection biasing the transistors to be normally nonconducting, and a control transformer having a primary winding and at least two secondary windings, the primary winding being connected between said output terminal and one output terminal of the regulator, the base of each transistor being connected to its emitter through one of said secondary windings, said first transistor becoming temporarily conducting upon a decrease in the current flowing through the series-impedance, and the second transistor becoming temporarily conducting upon an increase in said current whereby the dynamic output impedance of the direct voltage source is reduced.

5. A regulator as claimed in claim 4, further including an emitter resistor in the emitter circuit of each transistor, and third and fourth transistors, the base-emitter circuits of said third and fourth transistors being connected across the emitter resistors of said first and second transistors respectively, and means intercoupling the collectors of said first and third transistors, and said second and fourth transistors, respectively.

6. A regulator for a direct voltage source having an output smoothing filter including a series impedance, comprising: first and second transistors of opposite conductivity type having emitter, base and collector electrodes, the emitter-collector circuit of the first transistor being connected between the output terminals of said filter, the emitter-collector circuit of the second transistor being connected between the output terminal connected to the series impedance and a point at a potential higher than that and having the same polarity as that of said output terminal, both emitters being connected to said output terminal, a direct conductive connection between the base of each transistor and its emitter, said direct current conductive connection biasing the transistors to be normally nonconducting, and an alternating current coupling between said series impedance and each of said bases, said first transistor becoming temporarily conducting upon a decrease in the current flowing through the series-impedance, and the second transistor becoming temporarily conducting upon an increase in said current, whereby the dynamic output impedance of the direct voltage source is reduced.

7. A regulator for a direct voltage source having an output smoothing filter including a series impedance, comprising: first and second transistors of opposite conductivity type having emitter, base and collector electrodes, the emitter-collector circuit of the first transistor being connected between the output terminals of said filter, the emitter-collector circuit of the second transistor being connected between the output terminal connected to the series impedance and a point at a potential higher than that and having the same polarity as that of said output terminal, both emitters being connected to said output terminal, a direct conductive connection between the base of each transistor and its emitter, said direct current conductive connection biasing the transistors to be normally nonconducting, a control transformer having a primary winding and a secondary winding, the primary winding being connected between said output terminal and one output terminal of the regulator, the base of each transistor being connected to its emitter through said secondary winding, said first transistor becoming temporarily conducting upon a decrease in the current flowing through the series-impedance, and the second transistor becoming temporarily conducting upon an increase in said current, whereby the dynamic output impedance of the direct voltage source is reduced.

References Cited
UNITED STATES PATENTS 2,956,172  10/1960  Torkildsen _____ 323—22 X JOHN F. COUCH, *Primary Examiner.*

A. D. PELLINEN, *Assistant Examiner.*

UNITED STATES PATENT OFFICE
CERTIFICATE OF CORRECTION

Patent No. 3,351,848                            November 7, 1967

Johannis Cornelis Lodder

It is certified that error appears in the above identified patent and that said Letters Patent are hereby corrected as shown below:

Column 4, line 71, "transistors" should read -- transistor --; line 73, "first" should read -- second --.

Signed and sealed this 16th day of December 1969.

(SEAL)
Attest:

Edward M. Fletcher, Jr.                    WILLIAM E. SCHUYLER, JR.
Attesting Officer                              Commissioner of Patents